United States Patent [19]
Andreatti, Jr. et al.

[11] Patent Number: 4,635,124
[45] Date of Patent: Jan. 6, 1987

[54] AUXILIARY FOCUSING CIRCUIT FOR AUTOMATIC FOCUSING CAMERA

[75] Inventors: Evo Andreatti, Jr., Rheems; Frank S. Krufka, Mount Joy, both of Pa.

[73] Assignee: RCA Corporation, Princeton, N.J.

[21] Appl. No.: 802,228

[22] Filed: Nov. 26, 1985

[51] Int. Cl.4 .............................................. G03B 3/00
[52] U.S. Cl. .................................... 358/227; 354/402
[58] Field of Search ............... 358/227, 225, 404, 405; 354/400, 402

[56] References Cited

U.S. PATENT DOCUMENTS

| | | | |
|---|---|---|---|
| 4,067,031 | 1/1978 | Enomoto | 354/400 |
| 4,200,378 | 4/1980 | Shenk | 354/400 |
| 4,319,171 | 3/1982 | Motoori | 354/400 |
| 4,348,089 | 9/1982 | Shenk | 354/400 |
| 4,370,038 | 1/1983 | Kimura | 358/227 |
| 4,482,234 | 11/1984 | Takagi et al. | 354/402 |
| 4,525,053 | 6/1985 | Shiokama et al. | 354/400 |
| 4,525,735 | 6/1985 | Krufka | 358/10 |
| 4,545,664 | 10/1985 | Sakai et al. | 354/400 |

Primary Examiner—Gene Z. Rubinson
Assistant Examiner—Stephen Brinich
Attorney, Agent, or Firm—E. M. Whitacre; D. H. Irlbeck; L. L. Hallacher

[57] ABSTRACT

An auxiliary focusing circuit for an automatic focusing solid state array camera includes a control circuit and a drive circuit. The camera includes a switch which is actuated when the lens travels a selected distance without being focused. The control circuit responds to the switch and actuates the drive circuit. The switch also reverses the direction of travel of the lens. The drive circuit rotates an optical scanning member and the camera can be focused while the lens travels in the opposite direction.

4 Claims, 4 Drawing Figures

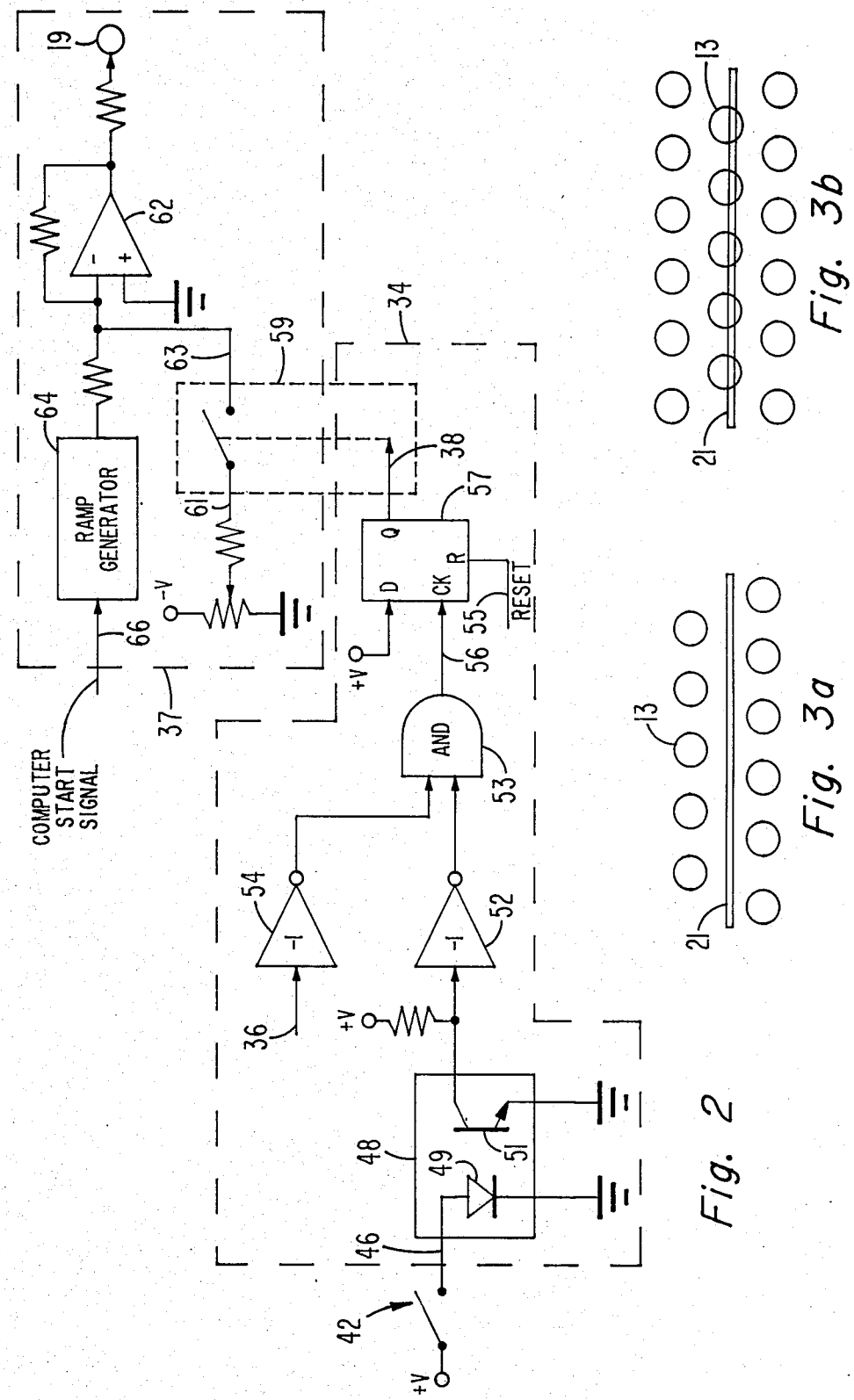

AUXILIARY FOCUSING CIRCUIT FOR AUTOMATIC FOCUSING CAMERA

BACKGROUND

This invention relates generally to automatically focusing, solid state array cameras, and particularly to an auxiliary focusing circuit for use with such cameras.

The use of automatically focusing cameras is rapidly becoming commonplace in various manufacturing operations. An example of such a use is the measurement of the characteristics of the phosphor screen on the faceplate panel of color television picture tubes. The screen of a color television tube is composed of triads of phosphors which are applied in a repetative sequence. Each of the phosphors emits a different color of light when impacted by electrons. There are two types of phosphor screens. In the first type screen, the phosphors are applied as vertical stripes which extend the full viewing height of the screen. In a matrix version of this screen, the vertical phosphor stripes are separated by a light absorbing material. Another type of screen is a dot screen, in which the phosphors are applied in triads of dots. In a matrix version of this screen type, the dots are separated by the light absorbing material. For both types of screens it is preferable to determine that the dimensions of the phosphor bearing areas are proper after application of the light absorbing matrix, but before application of the phosphor elements. Accordingly, the clear areas between the black matrix materials are measured prior to applying the phosphors to the screen. Also, it is sometimes useful to make measurements after the phosphors are applied.

Typically, measurements are made by shining light through a selected section of the screen and focusing the light with an automatically focusing camera. After the camera is properly focused, the light impinges upon a light responsive imaging medium, such as a photodiode array or a charge coupled device (CCD). The pixels of the imaging medium which are shaded by the black matrix portions of the screen are charged to one level, and the pixels which receive light through the line or dot portions are charged to a different level. The pixel information is then provided to a computer, which controls the system, and used to determine the dimensions of the phosphor bearing areas and of the black matrix portions of the screen.

Typically, during the imaging, light is focused by the camera onto a moveable reflective galvo which is rotated to cause the light to scan lines from the area being measured across the light responsive imaging medium. Light from the galvo is reflected to a fixed mirror and then to the imaging medium so that a large number of data lines are received for each of the measured areas. When the screen is of the line type, the galvo scans the screen in a direction which is perpendicular to the direction of the phosphor lines. The edges of the lines are used for the automatic focusing. When the screen is of the dot type, the dots are used to focus the camera. However, with a dot type of screen, it is possible for the imaging medium to lie between the horizontal rows of dots and no information useful in automatically focusing the camera is imaged onto the imaging medium. When this condition occurs, the camera cannot be focused and no useful data is obtained for that position of the galvo. For these reasons, there is a need for an auxiliary focusing circuit which assures that imaging information is received for all orientations of the rotatable galvo and for all positions on the face of the panel. The present invention fulfills this long felt need.

CROSS REFERENCE TO RELATED APPLICATIONS

U.S. application Ser. No. 572,150, now U.S. Pat. No. 4,556,902, entitled "System and Method For Measuring The Area And Dimensions of Apertures In An Opaque Medium" filed Jan. 19, 1984 by Frank S. Krufka discloses a system which can be modified to include the present invention when the shadow mask is a dot screen type of mask. This application describes a computer controlled system for measuring the area and dimensions of apertures in a kinescope shadow mask and is illustrative of another industrial use of automatically focusing cameras.

SUMMARY

An auxiliary focusing circuit for an automatic focusing camera having a focusing lens, a focusing motor for moving the lens, a focus control circuit and a switch for reversing the motor when the lens fails to focus. The camera is responsive to imaging apparatus including a light responsive imaging medium, and scanning means for scanning light across the imaging medium. The auxiliary focusing circuit includes a control means, which is responsive to the switch, and provides a control signal upon actuation of the switch. A drive means is responsive to the control signal and incrementally moves the scanning means in response to the control signal, whereby the lens is focused when the motor reverses.

BRIEF DESCRIPTION OF THE DRAWINGS

FIG. 2 is a more detailed showing of a galvo control and galvo drive circuit in accordance with a preferred embodiment.

FIGS. 3a and 3b show how a linear diode array type of imaging medium can fall between, and on, the phosphor dot areas of a dot type of kinescope screen.

DETAILED DESCRIPTION

Figure 1:
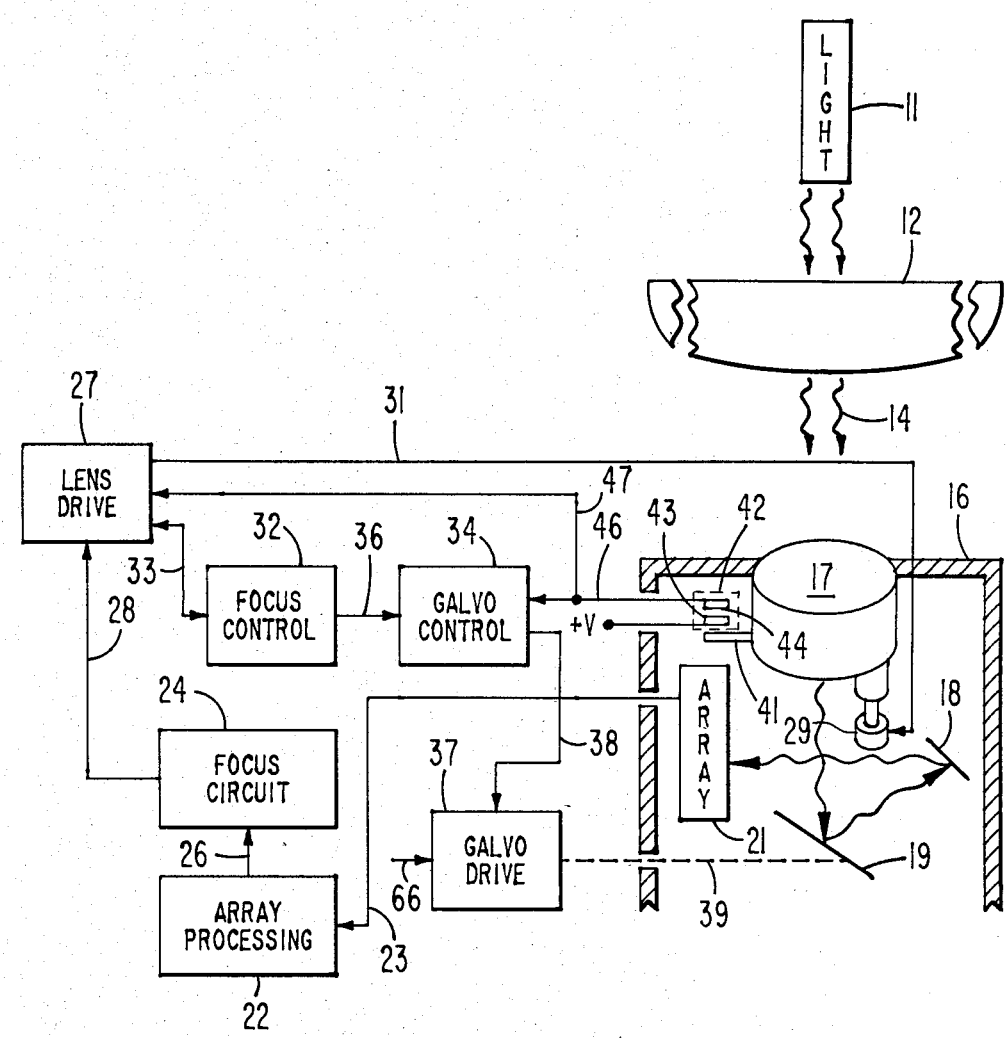
FIG. 1 shows a system for automatically focusing a camera during the measurement of the characteristics of a faceplate panel modified in accordance with the claimed invention.

In FIG. 1, a light source 11 illuminates a kinescope faceplate 12 having a screen composed of a large plurality of phosphor dot areas 13 (FIGS. 3a and 3b) on the inside surface. The diameters and spacing of the dots are to be measured. The measurements can be made using the system described in Patent Application Ser. No. 572,150, now U.S. Pat. No. 4,556,902. The light rays 14 are received by a camera 16 which includes a focusing lens 17, a fixed mirror 18, a scanning galvo mirror 19 and a light responsive imaging medium 21, such as photodiode array or a charge coupled device (CCD). The photodetector array 21 can be an H-series model 1728 photodetector available from EG&G Recticon and as such has 1728 pixels which are individually responsive to light energy. Thus, as the light rays 14 pass through the screen on the faceplate 12, the pixels of the photodetector array 21 which receive light passing through the phosphor dot areas are charged to one level while those which are shaded by the black matrix material between the dots 13 are charged to a different level. The energy levels from the individual pixels of the photodetector array 21 are fed to an array processing circuit 22 by a line 23. The array processing circuit 22 is supplied by the vendor of the photodetector array. The array processing circuit 22 provides an analog video signal to a focus circuit 24 over a line 26. The output of the focus circuit 24 is provided to a lens drive circuit 27 by a line 28. The lens drive circuit 27 actuates a camera focus motor 29 by way of a line 31. The camera focus motor 29 is used to move the lens 17 toward and away from the panel 12 to automatically focus the camera 16, in a known manner. The lens drive circuit 27 and a focus control circuit 32 have bilateral communication over a line 33. The focus control circuit 32 actuates a galvo control circuit 34 by way of a line 36. The galvo control circuit 34 actuates a galvo drive circuit 37 over a line 38. The galvo drive circuit 37 is coupled to the galvo mirror 19 of the camera 16 by a coupling 39. The focus circuit 24, lens drive circuit 27, focus control circuit 32, and camera motor 29, are commercially available and therefore are within the purview of one skilled in the art and the details are not required herein.

An actuating member 41 is permanently affixed to the lens 17 and therefore moves toward and away from the panel 12 as the lens 17 moves to focus the camera 16. A switch 42 includes a voltage biased contact 43 and a neutral contact 44. The neutral contact 44 is connected as an input to the galvo control 34 by a line 46. The neutral contact 44 is also coupled as an input to the lens drive circuit 27 by the line 46 and another line 47. During the normal focusing operation, the array 21 receives light from the dots 13, as shown in FIG. 3b, and the edges of the dots are used to focus the camera 16. When the lens 17 is ideally focused on the screen of the panel 12, the focus circuit 24 actuates the lens drive circuit 27 to stop the lens motor 29. When the array 21 lies between the dots 13, as shown in FIG. 3a, the camera 16 can not be focused. When the lens is in the lowest position and starts moving to focus, light impinges on the array 21 for the conditions of both FIGS. 3a and 3b, and it appears that the lens can focus. However, for the condition of FIG. 3a, as the lens approaches the focus point light leaves the array 21 and the lens can not focus the camera 16. Accordingly, the lens continues to move and when the actuating member 41 reaches the voltage biased contact 43, the contact 43 is moved into electrical contact with the contact 44 and an input signal is applied to the galvo control 34 and to the lens drive circuit 27. The signal applied to the lens drive 27 causes the motor 29 to reverse direction to move the lens 17 away from the panel 12. Simultaneously, the galvo control 34 actuates the galvo drive 37 to cause the galvo 19 to move slightly thereby changing the positioning of the image on the array 21, and focusing of the camera can be accomplished while the lens 17 is traveling away from the panel 12.

FIGS. 3a and 3b depict a small portion of a dot screen on the inside surface of the panel 12. In FIG. 3a the photodiode array 21 lies between the phosphor dot areas 13 on the screen and accordingly no object is imaged onto the array 21 and the camera 16 can not be focused. The signal which is applied to the galvo control 34 by the closure of the switch 42 causes the galvo drive 37 to slightly rotate the galvo 19 and the image is projected onto the photodiode array 21, as illustrated in FIG. 3b. Because the image is now projected onto the photodiode array, the camera 16 can be focused as the lens 17 moves away from the panel 12.

FIG. 2 shows logic circuit means, including the galvo control circuit 34 and the galvo drive circuit 37, in more detail. When the switch 42 is closed, because of the failure of the camera 16 to focus, a positive voltage is applied to the galvo control circuit 34 through an optoisolator 48. The optoisolator 48 includes a light emitting diode 49 (LED) and a light responsive transistor 51. The emitter of the transistor 51 is coupled to ground and the collector is positive voltage biased and is coupled as the input terminal to an inverter 52. The output terminal of the inverter 52 provides an input to an AND gate 53. The other input terminal of the AND gate 53 is connected to the output of another inverter 54. When the switch 42 is open, the transistor 51 is nonconductive and the output of the inverter 52 is low, and the AND gate 53 output is low. The input line 36 of the inverter 54 is normally high so that the AND gate 53 is not enabled. The input terminal of the inverter 54 is made low, in response to a ready signal from the focus control 32 and the AND gate 53 is enabled. With the AND gate 53 enabled, when the switch 42 closes, the LED 49 is actuated and turns on the light sensitive transistor 51 causing the input terminal of the inverter 52 to go low. Both input terminals of the AND gate 53 are then high and the output line 56 goes high. The high on the output line 56 is applied to the clock input of a D-type flip-flop 57, the D input of which is biased high. The Q output of the flip-flop 57 on the line 38 then goes high. A voltage responsive switch 59 closes in response to the high on the output line 38. The voltage responsive switch 59 can be a solid state switch, such as the optoisolator 48, or a fast acting solenoid type of switch. When the switch 59 closes, a negative bias voltage, present on an input line 61, is applied to an amplifier 62 by way of an input line 63. This voltage actuates the galvo 19 and changes the image condition from that of FIG. 3a to that of FIG. 3b. The change of image permits the camera 16 to be focused while the lens 17 is moving away from the panel 12 and data which otherwise would be lost is provided to the array processor 22. It should be noted that the flip flop 57 is reset by the system control computer, by a signal on reset line 55 before each focus cycle. Also, when the lens 17 moves away from the panel 12, the switch 42 is opened resulting in the opening of the voltage sensitive switch 59, and the galvo control circuit 34 is prepared to correct the next unfocused image.

The galvo drive circuit 37 includes a ramp generator 64 having an input line 66. The line 66 receives a start signal from a computer which controls the system in the manner described in copending application Ser. No. 572,150. The ramp generator 64 provides a ramp which is amplified in the summing amplifier 62 and applied to the galvo 19 to cause the imager to be swept across the photodiode array 21. The ramp allows a number of scans over a given area, such as 10 mils. In this manner, a large number of scans is swept across the dot images illustrated in FIGS. 3a and 3b.

Each time the image condition of FIG. 3a arises, the switch 42 is closed and the inventive auxiliary focusing circuit, comprising the galvo control 34 and the galvo drive circuit 37, automatically changes the image condition to that of FIG. 3b, to focus the camera as the lens 17 moves away from the panel 12. Accordingly, with the invention, image data is obtained for all orientations of the galvo with respect to the screen on the panel 12.

What is claimed is:
1. An auxiliary focusing circuit for an automatic focusing camera, said camera including a focusing lens, a focusing motor for moving said lens, a focus control circuit and a switch for reversing said motor when said lens fails to focus, said camera being responsive to imaging apparatus including a light responsive imaging medium, and scanning means for scanning light from said camera across said imaging medium, said auxiliary focusing circuit comprising:

control means, responsive to said switch, for providing a control signal upon actuation of said switch; and drive means, responsive to said control signal for moving said scanning means at least one increment in response to said control signal whereby said lens can focus when said motor reverses.

2. The focusing circuit of claim 1 wherein said control means is a logic circuit.

3. The focusing circuit of claim 2 wherein said logic circuit includes a dual input gate, one input of said gate being enabled by said focus control circuit, and another input of said gate being responsive to said switch; and wherein said logic circuit further includes multistate circuit means responsive to said dual input gate, whereby said multistate circuit means provides said control signal when said switch is actuated.

4. The focusing circuit of claim 3 further including voltage responsive switch means arranged between said logic circuit and drive means.

* * * * *